Nov. 20, 1962

A. S. PARKS 3,064,474

METERING APPARATUS

Filed May 13, 1957

Asbury S. Parks
INVENTOR.

BY Vincent Martin
Jod E. Edwards
ATTORNEYS

Nov. 20, 1962  A. S. PARKS  3,064,474
METERING APPARATUS
Filed May 13, 1957  4 Sheets-Sheet 4

Fig. 7

Asbury S. Parks
INVENTOR.

BY Vincent Martin
Jod E. Edwards
ATTORNEYS

United States Patent Office 3,064,474
Patented Nov. 20, 1962

3,064,474
METERING APPARATUS
Asbury S. Parks, 3 E. Rivercrest Drive, Houston, Tex.
Filed May 13, 1957, Ser. No. 658,745
24 Claims. (Cl. 73—200)

This invention relates to new and useful improvements in metering apparatus.

As is well known, the accurate measurement of liquids, which are separated from well streams, is of importance in the oil industry and various types of metering apparatus, generally referred to as metering separators, have been in use for this purpose. The usual type of metering separator includes a vessel or tank, which receives the separated liquid, and usually a float mechanism is located within the vessel and is adjusted so that upon the admission of a predetermined quantity of liquid into the vessel, for example, one barrel, the float actuates a dump valve to discharge such predetermined quantity. In this way, a counter which registers the number of barrels or other units of measurement of said liquid provides information as to the quantity of liquid, which has been separated from the well stream.

For various reasons, the metering separators now in general use are not completely accurate in measuring the liquids passed therethrough, and are also objectionable because of the difficulty of adjusting the same to meet varying conditions.

It is, therefore, one object of this invention to provide an improved metering apparatus or separator, which will accurately measure liquids and which eliminates the disadvantages which are present in usual type of metering apparatus now in use.

An important object of the invention is to provide an improved metering apparatus or separator wherein two spaced floats are disposed within a vessel with said floats controlling the dumping and filling of the vessel, so that very accurate measurement of the liquid passing through the vessel will be accomplished.

Another object is to provide an improved metering apparatus, of the character described wherein the float assembly may be properly positioned within the vessel to control the liquid level therein, together with means accessible from the exterior of said vessel for adjusting the exact position of the float to compensate for changing conditions and thereby assure complete accuracy of the measurement of any liquid, which is directed through the vessel.

A further object is to provide a metering apparatus having a float assembly, which controls the application of pressure to a pressure-actuated dump valve and which is so arranged that, after the float is triggered to open the dump valve, the float has no further control over said valve, with the result that any turbulence of the liquid to which the float may be subjected or bouncing of the float will not affect said valve and will not interfere with metering accuracy.

A particular object is to provide a metering apparatus including an improved float assembly, which is of such construction that it may be inserted within the vessel through a minimum size opening in the vessel wall and which is combined with a pilot valve unit in such a manner that very small changes in liquid level in the vessel will react upon the float to actuate the pilot valve unit, whereby extreme accuracy of liquid measurement is obtainable.

Still another object is to provide an improved float assembly for a metering apparatus wherein the float may be mounted in a manner to exactly balance the weight of the float element either in gas or liquid, whereby the float element is extremely sensitive to slight changes in liquid level to produce extreme accuracy of measurement; the arrangement also providing an adjustment, which may be made from the exterior of the vessel after the float element has been balanced to change the position of the float without affecting its balanced condition.

Another object is to provide an apparatus of the character described, which includes an improved apparatus of the character described, wherein the float mechanism and pilot control assembly may be readily employed with any type of vessel, either vertical or horizontal, and may be used either with the metering vessel alone or with the metering vessel in combination with a liquid and gas separator.

The construction designed to carry out the invention will be hereinafter described, together with other features thereof.

The invention will be more readily understood from a reading of the following specification and by reference to the accompanying drawings forming a part thereof, wherein an example of the invention is shown, and wherein.

In the drawings (FIGURE 1) the numeral 10 designates a vessel or tank, which may be of any predetermined size. The tank has its upper end closed by the usual dome 11 and is formed with a bottom 12. A liquid line 13 is connected into the bottom 12 and, as will be explained, functions as both an inlet and an outlet line, depending upon the position of a main valve 14. The valve 14, which will be hereinafter described in detail, is a three-way valve and, when in one position, establishes communication with a liquid inlet pipe 15 and the line 13, which connects to the lower end of the vessel. In its other position, the three-way valve 14 shuts off communication between the inlet pipe 15 and the line 13 and at the same time establishes communication between the liquid line 13 and a discharge conductor 16. The pipe 15 may extend from a separator or from any source of liquid, which is to be metered or measured.

Figure 1:
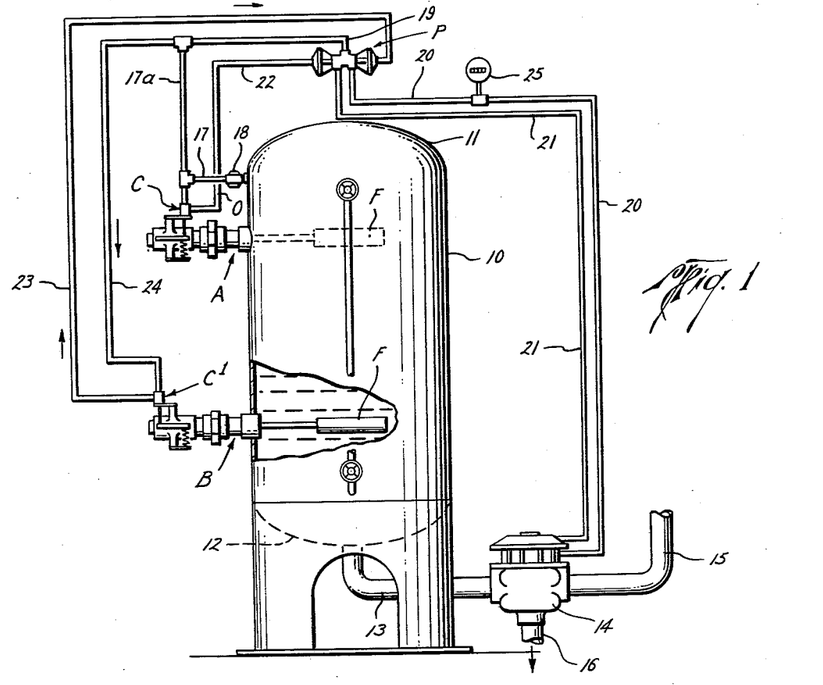
FIGURE 1 is a view partly in section and partly in elevation, showing a metering apparatus or separator, constructed in accordance with the invention.

With the three-way valve 14 in a position establishing communication between the inlet pipe 15 and the line 13, liquid is introduced into the lower end of the metering vessel 10. The capacity of the metering vessel is predetermined and, as will be explained, when a predetermined volume of liquid, for example, one barrel, has entered the vessel, the three-way valve 14 is actuated to shut off further communication between the liquid inlet pipe 15 and the line 13, and to simultaneously establish communication between the line 13 and the discharge conductor 16. When this occurs, the predetermined quantity of liquid, previously introduced into the vessel, is permitted to escape from the vessel through the conductor 16; upon the escape of the predetermined or measured quantity of liquid from the vessel, the main valve 14 is again operated to again admit additional liquid into the vessel 10 from the liquid inlet line 15 and to simultaneously close conductor 16. Upon the predetermined quantity of liquid having entered the vessel 10, the main valve 14 is again actuated to discharge such predetermined quantity of liquid through the conductor 16. The operation is repeated so long as liquid is being introduced through the liquid pipe 15, and since each operation represents a predetermined quantity or volume of liquid, it is evident that a measurement of the liquid is obtained.

For actuating the main valve 14 upon each cycle of operation, that is, upon the predetermined quantity or volume of liquid being introduced into the vessel, an upper float assembly, generally indicated at A, is mounted in the upper portion of the vessel. A lower float assembly B is disposed within the vessel in a predetermined relationship to the float assembly A. As will be described, the introduction of liquid into the vessel 10 will continue until the upper level of said liquid acts upon the float element F of the upper float assembly. Upon the liquid level reaching this float and acting thereupon, the main valve 14 is actuated so as to shut off communication between the liquid inlet line 15 and the line 13, so that no further liquid is admitted into the vessel; simultaneously therewith communication is established between the line 13 and the discharge conductor 16, and liquid is permitted to discharge from the vessel 10.

As the liquid level in the vessel falls and finally moves opposite the float element F of the lower float assembly B, the action of the liquid on the float element will cause the main valve 14 to be actuated to again shut off communication between line 13 and the discharge conductor 16. Simultaneously therewith, communication is re-established between the liquid inlet pipe 15 and the line 13, so that a filling of the vessel may be repeated. The amount of liquid, which is discharged from the discharge conductor 16, is controlled by the distance between the float elements F of the float assemblies A and B. By properly locating these float elements within the vessel 10 and in accordance with the particular liquid being measured, it is evident that, upon each cycle of operation, a predetermined quantity or volume of liquid may be discharged. As an example, the float assemblies A and B may be so located, and the size of the vessel may be such that upon each cycle of operation, exactly one barrel of liquid is discharged from the vessel. By determining the numebr of cycles or operations, the exact number of barrels of liquid being measured can be determined.

The particular details of construction and mounting of the float assemblies A and B will be hereinafter described in detail. The particular control arrangement, whereby the operation of the main valve 14 is controlled, is illustrated in FIGURE 1. Referring to this figure, a pilot control unit C is associated with the upper float control assembly A while a similar pilot control unit $C^1$ is associated with the lower float assembly B. A pressure control valve P is provided for the purpose of controlling the direction of pressure to the main control valve 14, and when the valve P is in one position, the main valve establishes communication between the liquid inlet pipe 15 and the line 13, while shutting off communication between line 13 and the discharge conductor 16; in the other position of the control valve P, the main valve shuts off communication between the liquid inlet pipe 15 and the line 13, while at the same time establishing communication between line 13 and the discharge conductor.

The control of the main valve is effected by a pilot pressure which may be supplied from any source. As illustrated, the pilot supply of the pilot gas is provided through a pilot supply line or pipe 17, which extends from the upper end of the vessel 14 (FIGURE 1). A suitable regulator 18 is connected in this line to maintain the pilot pressure at the desired point. Since there is gas present in the upper end of the vessel, this is a good source of supply for the pilot gas, but the line 17 could extend from any gas source, which is properly regulated to the desired pressure. The pilot supply line 17 has connection through a branch 17a with a line 19, which extends to the pressure control valve P. Depending upon the position of the valve P, the pressure from line 19 will flow either through a line 20, which extends to the main valve, or through a line 21, which also extends to the main valve. As will be explained, when pressure is conducted through line 20, the main valve 14 is in a position which establishes communication between the line 13 and the discharge conductor 16. When the pilot pressure is applied to the main valve through the conductor 21, then the main valve is in a position which establishes communication between the liquid inlet pipe 15 and line 13.

The position of the control valve P is controlled by the pilot units C and $C^1$ of the float assemblies A and B. The pilot assembly C controls the application of pressure through a conductor 22 to one end of the valve P while the control unit $C^1$ controls the application of pressure through a conductor 23 to the opposite end of the valve P. Thus, depending upon which float assembly has actuated its pilot control unit, the valve P is in one position or another to thereby control the position of the main valve 14.

Briefly describing the operation of the control arrangement of FIGURE 1 and assuming that the liquid inlet pipe 15 is in communication with the line 13 connecting to the bottom of the vessel, pilot pressure is being directed through the control valve P, conductor 21 and to the main valve to maintain this valve in position establishing such communication. As the liquid flowing into the vessel 10 rises, it will finally reach the float element F of the upper float assembly, and this will result in an actuation of the pilot control unit C. When this unit is operated, pilot pressure from the supply line 17 may flow through the pilot control unit C and then through the conductor 22 to one side of the pressure control valve P to shift said valve. When valve P is shifted, the pilot pressure from the line 19 passes through valve P and to the line or conductor 20. The application of pilot pressure through the line 20 to the main valve 14 results in an operation of that valve to shut off communication between the liquid inlet pipe 15 and the line 13 and to, at the same time, establish communication between the line 13 and the discharge conductor 16.

As this occurs, the liquid from the vessel is discharged through the conductor 16, and when the liquid level falls opposite the float element F, the effect of the liquid on the float will cause the float to actuate its pilot unit $C^1$. Operation of the unit $C^1$ directs pilot pressure through a supply conductor 24, through the pilot control unit $C^1$ and through the conductor 23 to the opposite side of the pressure control valve P, causing a shifting of the latter valve whereby communication is established between the supply line 19 and the line 21, which leads to the main valve 14. This results in a movement of the main valve 14, which shuts off communication between line 13 and the discharge conductor, and establishes communication between the liquid inlet pipe 15 and the line 13, whereby liquid is again re-introduced into the vessel 10. As the level rises to the float element F of the upper float assembly A, the operation is repeated. In order to count the number of cycles, that is each time a predetermined quantity of liquid is discharged from the vessel 10, a pneumatic counter 25 may be connected in the conductor 20. This counter may be of the pneumatic type, which is actuated by a pressure impulse, and thus each time that pilot pressure is applied to the line 20, the counter is actuated. By viewing the number which appears on the counter, the operator may, at all times, know the exact quantity of liquid which has been metered or measured.

Figure 5:
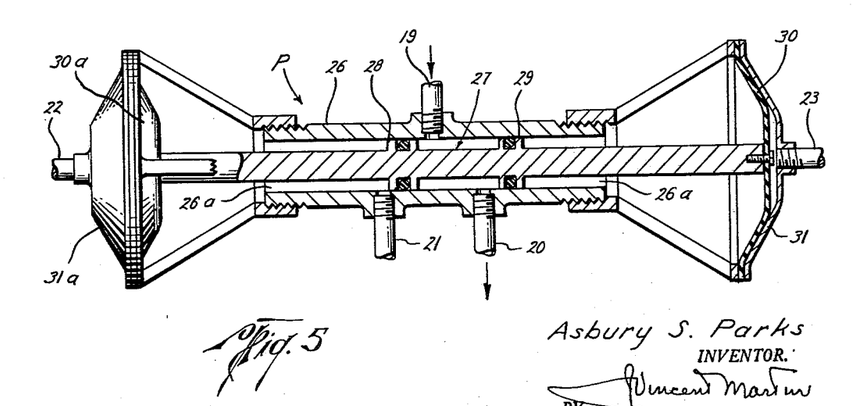
FIGURE 5 is a longitudinal sectional view of the pressure control valve.

Any suitable type of control valve, which would shift the pressure from line 20, or the line 21, as the case may be, may be employed, but one type of valve which has been found suitable is illustrated in FIGURE 5. This valve comprises a cylindrical casing 26, having a piston type valve element 27 therein. The supply line 19 is connected to the cylindrical casing or housing of the valve on one side thereof, while the lines or conductors 20 and 21 are also connected in the casing in spaced relationship to each other. The valve element 27 is formed with spaced valve heads 28 and 29, which are so positioned that when the valve element is at one limit of its movement in one direction, as shown in FIGURE 5, a communication is established between the supply line 19 and the conductor 20. At the same time, communication to atmosphere is established between the other line 21 through the bore 26a of the valve casing. Upon a shifting of the valve element 27 to its extreme limit to the left, as viewed in FIGURE 5, the piston valves 28 and 29 establish communication between the supply line 19 and the other conductor 21; at the same time, the line 20 is vented to atmosphere through the bore 26a of the valve casing.

For actuating the valve P, the ends of the valve element are connected to diaphragms 30 and 30a, which have their peripheral portions clamped to end closures or cases 31 and 31a. The conductor 23 has connection with the end closure 31 so as to communicate with the area between said closure and diaphragm 30 while the conductor 22 has connection with the other end closure or case 31a of said valve, and communicates with the area between said closure and the diaphragm 30a. When the upper float assembly A actuates its pilot control unit C, pilot pressure is conducted through line 22 and acts against the diaphragm 30a to move the valve P and its valve element 27 to the position shown in FIGURE 5. In such position, communication is established between the main pilot supply line 19 and the conductor 20. Upon the operation of the pilot unit $C^1$ by the lower float assembly B, pressure is directed against the diaphragm 30 which shifts the valve element 27 to the left in FIGURE 5 to establish communication between the main supply line 19 and the conductor 21. It is noted that the valve P is actuated solely by pressure applied against either one end or the other, and there is no spring return. Therefore, once that the valve has been shifted to one position, it remains in such position until pressure is applied in a direction which will cause it to shift. This is of importance because, after the valve has been shifted to establish communication between the main pilot supply 19 and one of the conductors 20 or 21, the pressure will remain applied to the main valve through the particular line until such time as the shifting of valve P is effected by actuation of one of the pilot control units.

The main valve 14 is also subject to some variation, but, as illustrated, is a three-way valve, which is pressure actuated. The valve is clearly shown in FIGURE 6 and comprises a main valve body 32 having an inlet 33 for connection with the liquid inlet pipe 15. Opposite the inlet 33 is an outlet 34 to which is connected the line 13 extending to the bottom of the vessel. A third opening or outlet 35 is provided in the lower end of the valve casing and has the discharge conductor 16 connected therein. Interposed between the openings 33, 34 and 35, are a pair of valve seats 36 and 37. A valve member 38 is adapted to engage either one or the other of the valve seats 36 and 37, and is provided with a valve stem 39, which extends upwardly through the valve body and into a diaphragm case 40. An operating diaphragm 41 disposed within the case has its central portion connected to the valve stem 39, and obviously as the diaphragm is moved either upwardly or downwardly the valve member 38 is caused to engage either the seat 36 or the seat 37.

The conductor 20, which extends from the pressure control valve P, is connected into the diaphragm case 40 below the diaphragm 41, while the conductor 21 also extending from the pressure control valve P has connection with the diaphragm case above the operating diaphragm 41. It will be evident that when pressure is conducted to the line 20, such pressure acts beneath the diaphragm 41 and raises the valve to the position shown in FIGURE 6, so that said valve engages the upper valve seat 36. In such position, communication between the liquid inlet pipe 15 and the line 13 extending to the vessel 10 is shut off. However, there is a communication established between the line 13 and the outlet or discharge conductor 16 since flow can occur past the lower valve seat 37.

Figure 6:
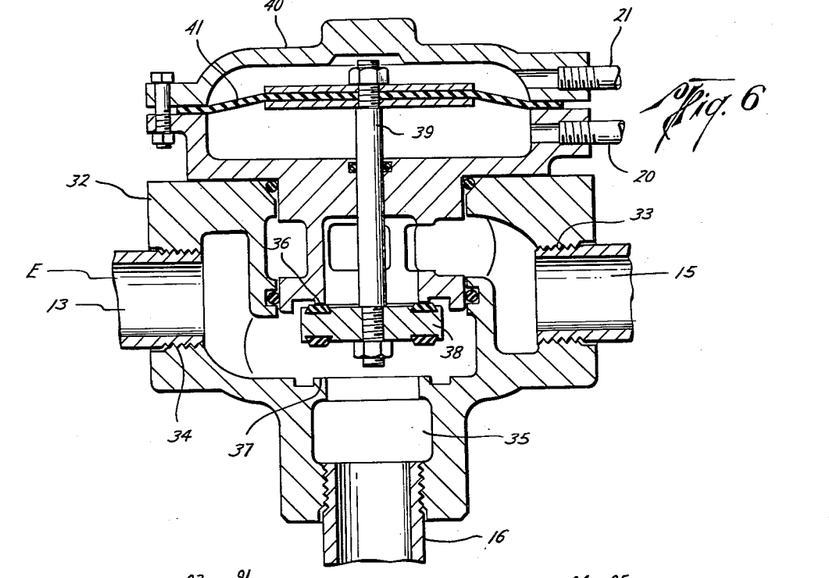
FIGURE 6 is a view partly in elevation and partly in section of a three-way valve which controls the admission and discharge of liquid from the vessel of the metering apparatus.

When pressure is applied through the conductor 21 and the pressure in conductor 20 is vented, the diaphragm 41 is moved downwardly, causing the valve 38 to engage the annular seat 37 and shut off communication between the line 13 and the discharge conductor 16. This movement of the valve, however, permits the free flow or communication between the liquid inlet pipe 15 and the line 13, such flow occurring past the upper valve seat 36. It is thus evident that a very simple three-way valve is employed which sets up alternate communication between the line 13 extending from the vessel 10 and either the liquid inlet pipe 15 or the discharge conductor 16. The position of the valve, as has been explained, is controlled by the application of pressure through either one or the other of the conductors 20 or 21. This application of pressure is controlled by the position of the control valve P, which is, in turn, controlled by the pilot units C and $C_1$, which are actuated by the float assemblies A and B.

Figures 2, 3, 4:
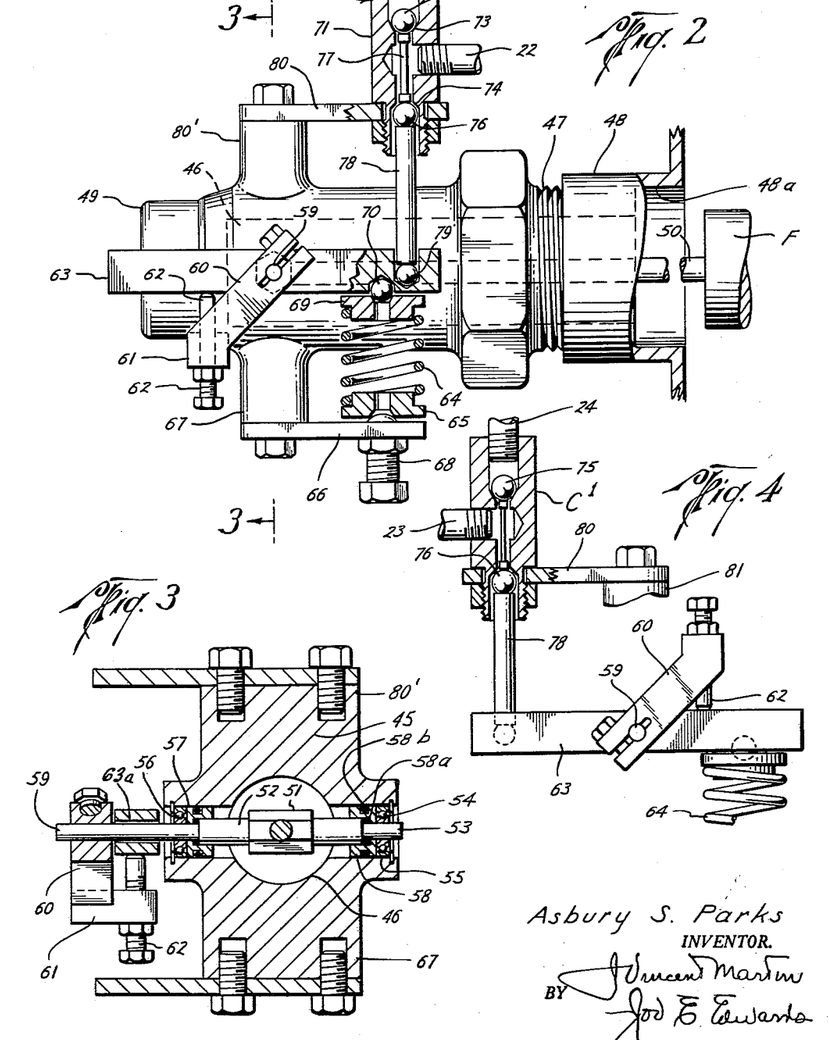
FIGURE 2 is a view partly in section and partly in elevation of the improved float assembly and illustrating the pilot control valve.
FIGURE 3 is a vertical sectional view taken on the line 3—3 of FIGURE 2.
FIGURE 4 is a partial view showing the position of the pilot valve with respect to the float assembly in the lower float mechanism.

The particular construction and mounting of the float assemblies, together with their co-action with their respective pilot control units, is an important feature of the present invention. The upper float assembly A is illustrated in FIGURES 2 and 3, and as shown in such figures, the assembly comprises a main body 45, which is formed with a longitudinal bore 46 in its central portion. One end of the body has a threaded connection 47, which is adapted to screw into a collar 48, which surrounds an opening 48a in the wall of the vessel 10, and thus the longitudinal bore 46 of the body is in communication with the interior of the vessel. The outer end 49 of the body is closed, with the bore 46 terminating short of such closed end, as indicated in dotted lines in FIGURE 2. The float element F which is of the displacement type, has one end of an elongate rod or arm 50 attached thereto, and the rod extends into the bore 46 of the body, with its opposite end secured in a block 51. The block is formed integral with or secured to a transverse shaft 52, which spans the bore 46 (FIGURE 3). The shaft 52 has one end 53 supported in suitable bearings 54 which are mounted within an opening 55 intersecting said bore 46. The opposite end of the shaft 52 is mounted in suitable bearings 56, supported within an opening 57, which is aligned with the opening 55, but which is disposed on the opposite side of the bore 46. A packing assembly 58 surrounds the end 53 of the shaft and has a packing ring 58a sealing with the shaft and a sealing ring 58b sealing with the bore 55; a similar assembly packs off around the opposite end of the shaft and seals with the bore 57. That end of the shaft 52 which extends through the opening 57 is formed with an extension 59 which projects outwardly from one side of the body 45, as is clearly shown in FIGURE 3. The float element F is thus supported by the float arm 50, which is attached to the rotatable shaft 52, such shaft extending transversely across the bore 46.

A displacement type float does not float upon the upper surface of the liquid in the manner of the hollow fully buoyant type but rather is weighted and may be partially or wholly submerged; as liquid rises and falls relative to the displacement type float, the float member in effect loses or gains weight in accordance with the level of liquid relative thereto and this variation in effective weight of the float member is proportional to liquid level. For balancing the weight of the float element F, an arm 60 has its upper end clamped or otherwise suitably secured to the projecting end 59 of the shaft 52 (FIGURE 2). The lower end of the arm 60 is provided with an extension 61 which has an adjusting screw 62 threaded therethrough and the end of the screw 62 is adapted to engage the under side of an actuator lever or bar 63. The lever 63 is disposed between the arm 60 and the side of the body 45, and has an opening 63a through which the extension 59 of shaft 52 extends, whereby the lever is freely rotatable or pivotally mounted upon said shaft. As is clearly shown in FIGURE 2, the end of the adjusting screw 62 engages the under side of the lever 63 on one side of shaft 52; the opposite end of the lever 63 overlies a coil spring 64, which has its lower end supported upon a bearing member 65, which is in turn mounted upon a bracket plate 66, the latter being bolted or otherwise secured to a depending projection 67 formed on the lower portion of the body 45.

The bearing member 65, which is engaged by the lower end of the spring 64, is actually supported upon the upper end of an adjusting screw 68, which is threaded through the supporting bracket 66. The upper end of the spring engages a bearing element or collar 69 which has engagement with the under side of the lever 63 through a ball 70, whereby friction of contact is reduced to a minimum.

With the arrangement as disclosed in FIGURES 2 and 3, the float element has its float arm or rod 50 secured to the rotatable shaft 52 upon which is clamped the arm 60. The arm 60 carries the adjusting screw 62 and this screw engages the under side of the lever 63 on one side of the shaft. The under side of the lever 63, at the end opposite the point of engagement of screw 62, is engaged by the ball 70, which is urged upwardly by the adjusting spring 64. It will be evident that by tightening the spring 64 an upward force is exerted upon one end of the lever 63. This upward force is converted into a downward force at the opposite end of the lever 63 by reason of the lever being pivoted about the shaft projection 59 and this downward force is applied to the adjusting screw 62, then through the arm 60 and to the shaft 52. By properly adjusting the tension on the adjusting spring 64, it is possible to exactly balance the weight of the float element F so that said float element is exactly in balance. With the float element exactly in balance, the slightest change of liquid level, with respect to the float element, will result in said float element either gaining or losing weight and upsetting the previous balanced condition. This upset of the balancing of the weight, as caused by the liquid, will result in a movement of the lever 63. This will be true because as the float element attempts to move upwardly by reason of liquid rising therearound, there will be a tendency to impart rotation of the shaft 52, and such rotation will reduce the force acting against the underside of the lever through the screw 62. However, since the spring 64 is exerting a constant force against the under side of the opposite end of the lever, the lever 63 will be swung to move that end of the lever which overlies the spring in an upward direction. It is this upward movement, as effected by the spring, which will result in an actuation of the pilot unit C, to direct the pilot pressure through the conductor 22 to that side of the pressure control valve P which will cause a shifting of the valve and will apply pressure in the proper direction to the main valve 14.

One of the particular features of the float assembly, as illustrated in FIGURES 2 and 3, is that after the float element has been balanced by proper adjustment of the spring 64, it is possible to change the position of the float element F within the vessel without upsetting this balanced condition. This is effected by merely rotating the screw 62. When this is done, the rotation of the screw 62 in effect imparts a swinging movement to the arm 60, and such arm, being attached to the extension 59 of the shaft 52, will impart a slight rotation to the shaft to cause the float rod 50 and its float element to change its position within the vessel. This adjustment is readily accessible from the exterior of the vessel, and may be made at any time without upsetting the balanced condition of the assembly, and, therefore, without interfering with the sensitive mounting of the float element. The adjustment of screw 62 after the assembly has been properly balanced, makes it possible to take care of any varying conditions, which might occur, after the initial adjustment of the float has been made.

The pilot assembly C is also illustrated in FIGURE 2 and includes a housing 71 having an axial bore 72 extending therethrough. An upper valve seat 73 is formed in the bore of the houhing, while a lower valve seat 74 is also formed in said bore. The conductor 22, which extends to the pressure control valve P, is connected between the valve seats 73 and 74, while the pilot supply line 17 has connection with the upper end of said bore. As illustrated, the upper valve seat 73 is at a greater angle than the angle of the lower valve seat 74. For example, it has been found that, by making the upper valve seat of 60°, while the lower valve seat is at 45°, satisfactory operation has been accomplished.

Co-acting with the upper valve seat 73 is a ball valve 75, and co-acting with the lower valve seat 74 is a ball valve 76. A valve rod 77 is disposed between the two valves 75 and 76 and is of such length that when one of the valves is seated, the other valve is unseated. Thus, if the upper valve 75 is closed, as illustrated in FIGURE 2, the lower valve 76 is open. This means that in such position of the pilot control unit any pressure in the conductor 22 would be vented past the lower valve 76 to atmosphere. Similarly, when the lower valve 76 is moved upwardly to its seated position, the upper valve 75 is unseated to establish communication between the lines 17 and 22.

For actuating the valves 75 and 76, a push rod 78 is provided and extends downwardly to the lever 63 of the float assembly. It is preferable to seat the lower end of the push rod on a ball 79 in order to reduce friction.

In the operation of the pilot control unit C, it will be assumed that the parts are in the position shown in FIGURE 2. In such position, the float element F has been properly balanced by means of the adjusting spring 64 and with no liquid engaging the float element, the push rod 78 is in a position which allows the lower valve 76 of the pilot unit to be unseated. The pressure in the pilot supply line 17 is acting to maintain the upper valve 75 in seated position. As the liquid rises in the vessel 10 and acts upon the float element F, the effective weight of the float element is reduced, and, when this occurs, the stored energy of the spring 64 will act upon the lever 63 and will move the push rod 78 upwardly. Initially, this upward movement is resisted by the pressure in the supply line 17, which is holding valve 75 closed and, through the connecting rod 77, is tending to prevent seating of the lower valve 76. Continued lightening of the effective weight of the float element permits the force of the spring 64 to continue to apply more pressure through the push rod to the lower valve 76 until the pressure holding valve 75 on its seat is overcome. When this occurs, the lower valve 76 moves onto its seat 74 and pilot pressure is permitted to flow from the pilot supply line 17 to the conductor 22. It is pointed out that because of the difference in the angle of the seats 73 and 74 with the ball valves of the same diameter, the pressure which was holding the valve 75 closed and which had to be overcome by the force of the spring 64 is now acting on the lower valve 76; because of the difference in angles, a lesser effective area is presented by the valve 76 to this same pressure than was presented to the valve 75 when said valve was closed. Therefore, the spring, which had sufficient force to unseat valve 75 against this pressure, has more than enough force to retain the valve 76 in its seated position. The effective area difference which is produced by the different seat angles when the ball valves are of the same diameter may also be produced by making the seat angles the same and using different size ball valves.

As the liquid level falls in the vessel by reason of the shifting of control valve P when pressure was applied through conductor 22, the effective weight of the float is again increased, and this causes the parts to return to their initial positions. The force of the spring 64 acting against the valve 76 is reduced, and then the pressure in conductor 22 may unseat valve 76 and be vented to atmosphere. At the same time, the pressure from supply line 17 moves the upper valve 75 to its seated position. Because the float element is constantly in balance by the previous adjustment of spring 64, it is extremely sensitive, and any slight change in liquid level will result in an operation of the pilot control unit to conduct the pressure through the line 22, actuate the pressure control valve P, and operate the main valve 14, whereby liquid may be discharged from the vessel.

The lower float assembly B is constructed in substantially the same manner as the upper float assembly with the exception that its pilot control unit $C^1$ is disposed at the outer or free end of the lever 63, in the manner shown in FIGURE 4. The arm 60, which is clamped to the extension 59 of the shaft 52, has its position changed so as to locate its screw 62 to act upon the upper surface of the lever 63 directly opposite the adjusting spring 64. In other words, in the lower float assembly the pilot control unit and its push rod 78 are disposed at that end of the lever 63 which is opposite the spring 64, and the adjusting screw 62 is acting upon the top of the lever opposite said spring. Thus, when the liquid level drops to the lower float assembly B, the effective weight of the float element is increased and such increase will result in actuating the pilot control unit $C^1$.

In connection with the lower float assembly B, it is pointed out that the pilot unit $C^1$ is of substantially the same construction as the pilot unit C, including an upper valve 75 and a lower valve 76. The pilot unit $C^1$ is carried by the same type of bracket 80, which supports the upper pilot unit C, except that the bracket is directed outwardly or toward the closed end 49 of the casing 45. In each case, the bracket is bolted or otherwise secured to a projection 80' formed on the casing.

With respect to the operation of the float assembly B, it will be evident by observing FIGURE 4 that as the liquid level falls downwardly below the float element F of the assembly B, an increase in the effective weight of the float element is produced, and this increase in weight is reflected through the arm 60 and the screw 62 to the lever 63. This additional force, plus the force of the spring 64, causes the push rod 78 to move upwardly and seat the lower valve 76 of pilot unit $C^1$ and open the upper valve 75 of said unit, whereby pilot pressure may be conducted from the line 24 and through the conductor 23 to the diaphragm 30 of the pressure control valve P, and thereby effect a shifting of such valve. When the valve is shifted, the main valve 14 is actuated and communication between the line 13 extending from the bottom of the vessel and the discharge conductor 16 is shut off, while at the same time communication is established between said line 13 and the liquid inlet pipe 15. As the liquid rises in the vessel 10, the effective weight of the float F of the lower assembly B is reduced and the float assembly returns to a balanced condition as illustrated in FIGURE 4, whereby the lower valve 76 of the pilot unit is permitted to open to bleed line 23. At the same time, valve 75 of the unit $C^1$ is seated to shut off any further pilot pressure to line 23.

From the foregoing it will be obvious that the upper float assembly A controls the actuation of the main valve 14 to discharge liquid from the vessel 10, while the lower float assembly B controls actuation of said valve to permit admission of liquid into the vessel. Both float controls are very sensitive in operation and will actuate the valve at exactly the proper instant so that a predetermined quantity of liquid may be discharged upon each cycle of operation. As has been explained, each float assembly may be balanced by the spring 64, and if, after such balance has been accomplished, it is desirable to change the actual position of the float element F of the assembly within the vessel, it is only necessary to adjust the screw 62. This adjustment merely changes the position of the float element by imparting a slight rotation to the shaft 52. All of the parts remain in balance because the only thing that happens is that the position of the float rod and its shaft, together with the position of the arm 60, is changed with respect to the lever 63. The balanced condition of the float element remains unchanged. Since the adjusting screw is readily accessible from the exterior, it is evident that the position of the float element may be changed without having to remove the assembly from mounted position on the vessel. The change is made quickly and proper adjustment is possible to suit variable conditions. It is further noted that the construction of the float assembly is such that it may be mounted through the single relatively small opening surrounded by the collar 48, thereby eliminating the use of large flanges or openings which would require a sealing means.

Figure 7:
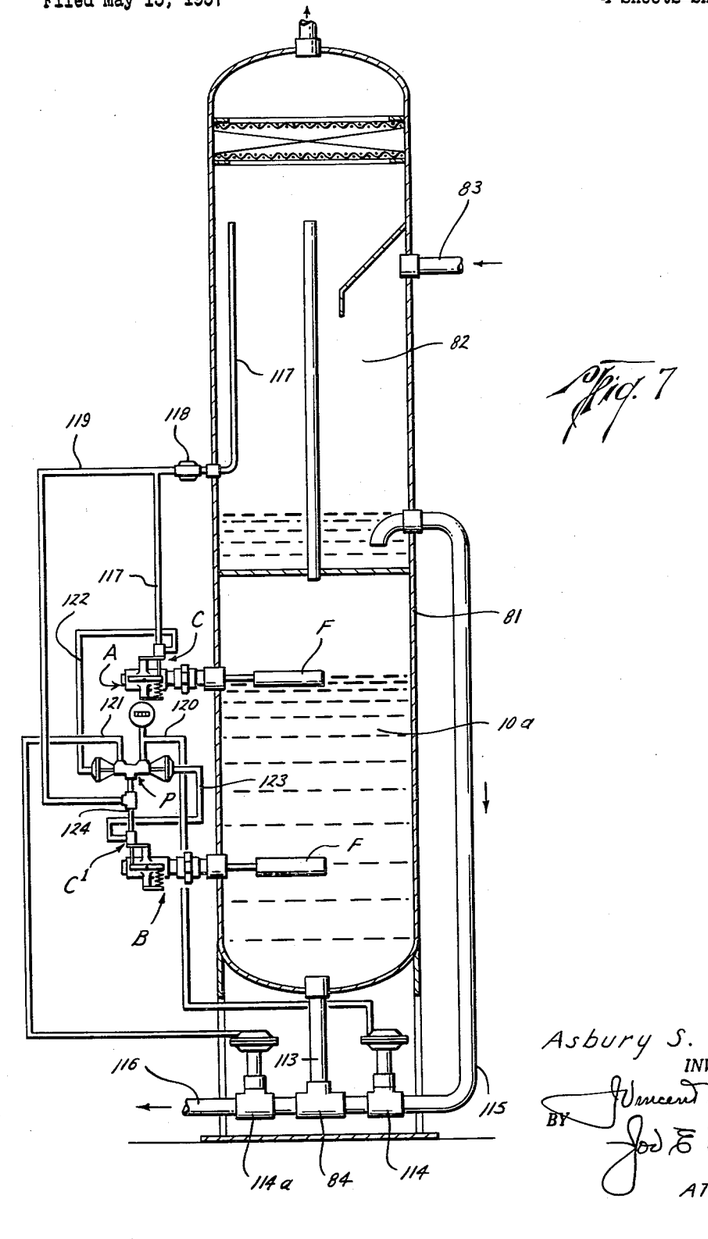
FIGURE 7 is a vertical sectional view of a combined oil and gas separator and a metering separator, showing the invention applied thereto.
Figure 8:
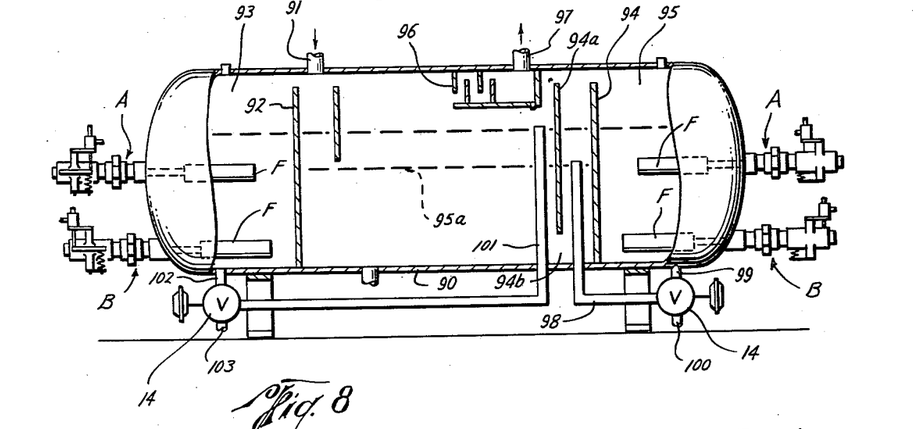
FIGURE 8 is a view partly in section and partly in elevation illustrating the invention applied to a horizontal vessel wherein both oil and water, which are separated from a stream, are metered or measured.

In FIGURE 1 the invention is shown as applied to a single tank or vessel, which in itself forms the metering separator. However, the invention may be applied to combination vessels, such as illustrated in FIGURES 7 and 8. In FIGURE 7 a tank 81 has a vessel 10a formed in its lower portion and an ordinary separator 82 formed in its upper portion. The well stream is introduced through inlet 83, and in the separator 82 the liquids are separated from the gas. The liquids, which are so separated, are conducted downwardly through a liquid pipe 115, and the lower end of this pipe has connection with a pipe 113 which is secured within the lower end of the vessel 10a. A diaphragm actuated valve 114, which would be of usual construction and which is arranged so as to be spring opening, is connected in the liquid inlet pipe 115. Extending from the T 84, which connects the liquid inlet pipe 115 with the pipe 113, is the discharge conductor 116, and this conductor has a spring opening valve 114a of the diaphragm type connected therein.

The vessel 10a of the unit shown in FIGURE 7 comprises the measuring vessel, which would be similar to the vessel 10 of FIGURE 1. The upper float assembly A is mounted at the desired point in the vessel 10a and the lower float assembly B is spaced therefrom with their respective float elements within the vessel so as to be acted upon by the liquid.

In this form the pilot supply gas may be taken from the upper end of the separator tank through a pipe 117, a suitable pilot regulator 118 being mounted therein. The line 117 connects with the pilot control unit C of the upper float assembly and has the conductor 122 extending to one side of the pressure control valve P. The pilot control unit $C^1$ of the lower float assembly obtains its pilot supply through line 119 and has a conductor 123 extending therefrom to the opposite side of the pressure control valve P. Line 120, to which pilot supply pressure is directed, has connection with the diaphragm case of the valve 114 while conductor 121 extends from the pressure control valve P to the valve 114a.

The operation of this form of the invention is substantially the same as the operation of the form heretofore described and shown in FIGURE 1. Instead of the three-way valve 14, the form shown in FIGURE 7 employs two separate valves 114 and 114a. As the liquid rises in vessel 10a and acts upon the float element F of the upper float assembly A, pilot pressure is directed to valve 114 to close this valve, and at the same time pressure is vented from valve 114a to open the latter. This permits liquid to flow from the vessel 10a and the discharge of liquid continues until such liquid acts upon the float element F of the lower float assembly B, at which time the pilot control unit $C^1$ applies pressure to the control valve P and this, in turn, results in an opening of valve 114 and a closing of valve 114a. Thereafter the cycle is repeated and a predetermined volume or quantity of liquid has been discharged from the vessel 10a.

In FIGURE 8 the invention is shown applied to a combination separator unit and is illustrated as metering both water and oil. In this form a horizontal separator 90 is provided with a well stream inlet 91, said stream containing water, oil and gas. A partition 92 forms an oil chamber 93 at one end of the vessel while a similar partition 94 provides a water chamber at the opposite end of the vessel. The float assembly unit A and B are disposed within the oil chamber and a second pair of float assemblies A and B extend into the water chamber. The float elements of these assemblies are, of course, properly located in order to measure the particular or predetermined quantity of liquid.

The well stream is introduced into the central portion of the separator 90 through the inlet 91 and the water and oil seek an interface as indicated at 95a. The gas, of course, rises to the upper end of the vessel, passes through a scrubber 96 and escapes through a gas outlet pipe 97. A water spillover pipe 98 is disposed adjacent the partition 94 and as the water rises above the upper end of this pipe, it passes downwardly through the pipe and through a three-way valve 14 of the construction shown in FIGURE 6. This three-way valve is controlled by the float element F of the assemblies A and B located in the chamber 95. So long as the water in chamber 95 has not risen to the upper float assembly A, the valve 14 is establishing communication between the spillover pipe 98 and a line 99, which extends into the bottom of chamber 95. The partial partition 94a is disposed adjacent the spillover pipe 98 opposite the partition 94 but does not extend to the bottom of the separator 90. This provides an opening 94b which communicates between the central portion of the separator 90 and the spillover pipe 98. The bottom of the partial partition 94a is positioned relative to the capacities of the central portion and the water chamber 95 so that the oil-water interfaces will never fall below the bottom of such partition, thereby eliminating the possibility of oil entering the spillover pipe 98.

As the water rises within chamber 95, the float element F of the upper assembly A actuates the valve 14 to shut off communication between the spillover pipe 98 and line 99, and to establish communication between line 99 and a discharge pipe 100. The position of the floats is such that a predetermined volume or quantity of water is discharged upon each cycle.

The oil, which is separated in the central portion of the separator 90, is, of course, above the water level therein, and an oil spillover pipe 101 has its upper end located at a point below the scrubber element 96. The oil spillover pipe 101 has connection with a three-way valve 14, which is in turn connected to a line 102 extending into the lower end of the oil chamber 93. The three-way valve also connects with a discharge conductor 103. Obviously, as the oil separated within the central portion of the separator spills over into pipe 101, it is conducted through this pipe, through valve 14 and into the oil chamber 93. As it rises therein, it ultimately reaches the float element F of the upper float assembly and this actuates the valve 14, connected in the line 101 to shut off the communication between the line 102 and the spillover pipe 101, while at the same time establishing communication between line 102 and the discharge line 103. Of course, as the oil level in chamber 93 drops and acts upon the float element F in the manner heretofore described, the valve 14 is again actuated to re-establish communication between the spillover pipe 101 and line 102 while shutting off communication to the discharge 103.

In all forms of the invention the float assemblies are mounted in a vessel or tank into which the liquid to be measured is introduced. The float assemblies are so located with respect to the vessel that the volume or quantity of fluid between the two float assemblies is a measured or predetermined quantity. As has been explained, the liquid to be measured is introduced into the vessel and as it rises therein it co-acts with the float element of the upper assembly. As it does so, the inlet valve, which is permitting the admission of liquid into the vessel, is closed and, at the same time, a discharge valve is opened, so that liquid begins to be discharged from the vessel. Discharge of the liquid continues until the liquid level drops to a point opposite the lower float assembly and the co-action of the liquid with the float element of said lower assembly, closes the discharge and opens the inlet so that the cycle of operation may be repeated.

The particular float assembly is very simple in construction and provides for a very sensitive mounting of the float element so that very accurate measurement of the liquid is possible. An important feature of the invention is the adjustment, which may be made exteriorly of the vessel, which will change the position of the float element of the assembly, without in any manner interfering with the balanced mounting of the assembly. The particular pilot unit, which is illustrated in FIGURE 2, is especially adapted for use in controlling the pressure control valve P. The arrangement is such that the slightest change in the effective weight of the float element will result in an actuation of the pilot valve unit. The use of the pressure control valve P, which is actuated solely by pressure, and which directs the pressure to the valve or valves controlling admission and discharge of liquid to the vessel, eliminates any possibility of turbulence in the vessel or bouncing of the float from entering into the operation. Once that the pressure control valve P is shifted by reason of operation of one of the pilot units, it remains in this shifted position until such time as the other assembly comes into operation. Therefore, assuming that the liquid has been rising in the vessel and has actuated the pilot unit C through the upper float assembly, the shifting of the pressure control valve P will operate valve 14. Any subsequent motion of the float element F of the upper assembly will not affect operation because the pressure control valve P will remain in its shifted position until such time as the lower float assembly B actuates its pilot control unit $C^1$, at which time the pressure valve is shifted to its opposite position. This is a feature of the invention because once that the float element has effected the operation of valve 14, that float element can no longer enter into the functioning of the apparatus, and thus extreme accuracy of measurement is assured.

Although the float assembly has been described herein as employed in a metering apparatus, it is evident that one of the assemblies may be employed as a float control unit for actuating any desired device in accordance with liquid level conditions in a vessel. In other words, the float assembly may be employed wherever it is desired to operate a device in accordance with liquid level in a confined area.

The foregoing disclosure and description of the invention is illustrative and explanatory thereof and various changes in the size, shape and materials, as well as in the details of the illustrated construction, may be made within the scope of the appended claims without departing from the spirit of the invention.

What I claim is:

1. A metering apparatus including, a vessel having a liquid inlet and an liquid outlet, control means for controlling flow through the liquid inlet to the vessel, control means for controlling flow through the liquid outlet from the vessel, an upper float assembly mounted on the vessel and including a float element projecting into the interior of the vessel, means forming part of said upper float assembly and accessible from the exterior of the vessel for balancing the weight of said float element to render the element highly sensitive to changes in liquid level, a lower float assembly mounted on the vessel and including a float element projecting into the interior of the vessel, means forming part of said lower float assembly and accessible from the exterior of the vessel for balancing the weight of said lower float element to render said element highly sensitive to changes in liquid level, means actuated by the change in effective weight of the upper float assembly when the liquid in the vessel rises to a predetermined level for operating the control means to shut off flow through the inlet and to permit discharge of liquid through the outlet and additional means actuated by the change in effective weight of the lower float assembly when the liquid in the vessel falls to a predetermined level for operating the control means to shut off flow through the outlet and permit admission of liquid to the vessel through the inlet.

2. A metering apparatus as set forth in claim 1, wherein the control means for controlling flow through the inlet and through the outlet is pressure-actuated, the means actuated by the float assemblies controlling the application and release of pressure to said control means to operate the same.

3. A metering apparatus as set forth in claim 1, wherein the control means for controlling the flow through the inlet and the outlet comprises a single three-way valve.

4. A metering apparatus as set forth in claim 1, wherein the control means for controlling the flow through the inlet is a pressure-actuated valve and also wherein the control means for controlling the flow through the outlet is a pressure-actuated valve.

5. A metering apparatus including, a vessel having a liquid inlet and a liquid outlet, pressure-actuated valve means for controlling flow through said inlet and said outlet, an upper float assembly mounted on said vessel and having a float element projecting into the interior thereof, means forming part of said upper float assembly and accessible from the exterior of the vessel for balancing the weight of said float element to render said element highly sensitive to changes in liquid level, a lower float assembly mounted on the vessel and having a float element projecting into the vessel, means forming part of said lower float assembly and accessible from the exterior of the vessel for balancing the weight of said lower float element to render the element highly sensitive to changes in liquid level, a source of operating pressure, means for conducting the operating pressure to the pressure-actuated valve means, a first control unit connected in the conducting means for controlling the application and release of operating pressure through the conducting means to the valve means, an operable connection between the first control unit and the upper float assembly for actuating said unit upon a change in effective weight of said upper float assembly when the liquid in the vessel rises to a predetermined level to thereby operate the pressure-actuated valve means to close the inlet and open the outlet, a second control unit connected in the conducting means for also controlling the application and release of the operating pressure through the conducting means to the valve means, and an operable connection between said second control unit and the lower float assembly for actuating said second control unit upon a change in effective weight of said lower float assembly when the liquid in the vessel falls to a predetermined level to thereby operate the pressure-actuated valve means to close the outlet and open the inlet.

6. A metering apparatus as set forth in claim 5, wherein the pressure-actuated valve means is a single three-way valve having connection with the inlet, the outlet and the vessel.

7. A metering apparatus as set forth in claim 5, together with a pressure-actuated counter device connected in the conducting means and operable upon each cycle of operation to record the total number of operating cycles of the pressure-actuated valve means.

8. A metering apparatus including, a vessel having a liquid inlet and a liquid outlet, valve means for controlling flow through said inlet and said outlet, an upper float assembly, a lower float assembly spaced downwardly a predetermined distance from the upper float assembly, control means for controlling operation of the valve means to shut off or permit flow through the inlet and the outlet, and means actuated by the change in effective weight of the float assemblies for actuating the control means in accordance with the liquid level conditions within the vessel, each float assembly comprising a body portion having a longitudinal bore therein, means for attaching said body portion to the vessel to establish communication between the bore and the interior of the vessel, a float element located within the vessel and having a float rod extending through the bore, a transverse shaft attached to the float rod whereby movement of the float element results in rotative movement of the shaft, means accessible from the exterior of the vessel and co-acting with the transverse shaft for balancing the weight of said float element and including an actuator member which is moved upon a change in the effective weight of the float element, and an operable connection between the actuator member and the control means whereby the control means is actuated in accordance with changes in effective weight of the float element.

9. A metering apparatus as set forth in claim 8, together with means for adjusting the position of the float element relative to the body without interfering with the balanced condition of said element, said adjusting means being accessible from the exterior of the vessel.

10. A metering apparatus including, a vessel having a liquid inlet and a liquid outlet, pressure-actuated value means for controlling flow through said inlet and said outlet, an upper float assembly mounted on the vessel, a lower float assembly mounted on the vessel and located in predetermined spaced relationship below the upper float assembly, each float assembly including a float element extending inwardly into the interior of the vessel, means accessible from the exterior of the vessel for balancing the weight of the float element, a pilot control unit actuated by a change in effective weight of the upper float assembly, a second pilot control unit actuated by a change in effective weight of the lower float assembly, a source of operating pressure, and conducting means for conducting the operating pressure to the pressure-actuated valve means which controls flow through the inlet an outlet of the vessel, said pilot control units being operably associated with said conducting means whereby actuation of the pilot control units by the change in effective weight of the float assemblies controls the application and release of operating pressure to the valve means in accordance with liquid level conditions within the vessel.

11. A metering apparatus as set forth in claim 10, together with means accessible from the exterior of the vessel for adjustably changing the position of the float element of each assembly without upsetting the balanced condition of said float element.

12. A metering apparatus including, a vessel having a liquid inlet and a liquid outlet, valve means for opening and closing said inlet and for opening and closing said outlet, an upper float assembly having a float element within the vessel, a lower float assembly having a float element within the vessel, each float assembly comprising a body having a longitudinal bore, a transverse shaft extending across said bore, a float rod extending from the float element having its other end projecting into the bore and secured to the transverse shaft, whereby movement of the float element tends to impart rotation to the shaft, one end of the shaft extending outwardly of the body and having an actuator lever pivotally mounted thereon, an arm secured to the outer extending end of the shaft and engageable with the lever, an adjusting spring also engaging the lever and co-acting with the lever and arm to effect a balance of the weight of the float element, any change in the effective weight of the float element resulting in a swinging movement of said lever about its pivot, and means actuated by the movement of the lever for operating the valve means, whereby the liquid inlet and outlet are opened and closed in accordance with liquid level conditions in the vessel.

13. A metering separator as set forth in claim 12, together with an adjusting means carried by said arm and engageable with the lever to effect a change in the position of the float element within the vessel without changing the balanced condition of said element.

14. As a sub-combination in a metering apparatus, a float asembly comprising a body having means for attaching it to a vessel, said body also having a longitudinal bore therein, a transverse shaft extending across the bore and having one end projecting outwardly exteriorly of the body, a float element disposed outside of the bore of the body and having its supporting rod extending within the bore and secured to the transverse shaft, a lever pivotally mounted on the projecting end of the transverse shaft exteriorly of the body, an arm secured to the transverse shaft and engageable with the lever, a spring means having one end supported by the body and its opposite end engageable with the lever, said spring means being so disposed with respect to the point of engagement of the arm with said lever that said spring means will balance the weight of the float element.

15. The sub-combination as set forth in claim 14, together with means for adjusting the force of the spring means whereby the float element may be balanced in accordance with the particular medium in which the float element is disposed.

16. The sub-combination as set forth in claim 14, together with an adjusting screw threaded through the outer end of the arm and engageable with the lever to effect the engagement between said arm and said lever, adjustment of said screw imparting a rotation to the transverse shaft to change the position of the float element relative to the body without effecting the balanced condition of the element.

17. The sub-combination set forth in claim 14, together with a pilot control unit supported upon the body and having a valve for controlling flow of a pressure fluid through said unit, and an operable connection between the lever of the float assembly and said valve for actuating the valve in accordance with the position of the float element as acted upon by a liquid.

18. The sub-combination as set forth in claim 14, together with a pilot control unit supported upon the body, said control unit comprising a housing having an axial bore with a radial outlet intermediate its ends, an upper valve seat within the bore above the outlet, a lower valve seat within the bore below the outlet, a downwardly seating upper ball valve, an upwardly seating lower ball valve, a connecting rod between the valves of such length that when one valve is seated the other is unseated, the angle of the upper valve seat with respect to the lower valve seat being such that the upper valve when in a seated position presents a greater cross-sectional area to pressure than does the lower valve when the latter is seated, and an operable connection between the lever of the float assembly and the lower valve, whereby movement of the lever by reason of a change in effective weight of the float element results in an actuation of the valves of the pilot control unit.

19. A metering apparatus as set forth in claim 5, wherein a pressure control valve is interposed in the conducting means for directing and releasing operating pressure to the pressure-actuated valve means, said pressure control valve being movable between a first position and a second position and being moved to said first position by operation of one of the control units and remaining in such position until moved to said second position by operation of the second control unit, said control valve remaining in the second position until subsequently returned to the first position by operation of the second control unit.

20. A metering apparatus including, a vessel having a liquid inlet and a liquid outlet, pressure actuated valve means for controlling flow through said inlet and said outlet, an upper float assembly mounted on said vessel and having a float element projecting into the interior thereof, means forming part of said upper float assembly and accessible from the exterior of the vessel for balancing the weight of the upper float element to render said element sensitive to changes in liquid level, a lower float assembly mounted on the vessel and having a float element projecting into the vessel, means forming part of said lower float assembly and accessible from the exterior of the vessel for balancing the weight of the float element to render said element sensitive to changes in liquid level, a source of operating pressure, means for conducting the operating pressure to the pressure actuated valve means, a pressure actuated control device connected in the conducting means and movable to one position to direct pressure to the valve means to permit flow through the inlet into the vessel, said device being movable to a second position to direct pressure to the valve means to allow flow from the vessel through the outlet, a control unit actuated by a change in the effective weight of the upper float element when the liquid rises to a predetermined level in the vessel for applying pressure to the control device to move it to its second position opening the outlet from the vessel, and a second control unit actuated by a change in the effective weight of the lower float element when the liquid falls to a predetermined level in the vessel for applying pressure to said control device to move it to its first position to permit flow from the inlet into the vessel, said control device remaining in the position to which it has been moved by one of the float elements unit it is moved to its other position by the other float element.

21. A metering apparatus including, a vessel having a liquid inlet and a liquid outlet, control means for controlling flow through the liquid inlet to the vessel, control means for controlling flow through the liquid outlet from the vessel, an upper float assembly mounted on the vessel and including a float element projecting into the interior of the vessel, means forming part of said upper float assembly and accessible from the exterior of the vessel for balancing the weight of said float element to render the element highly sensitive to changes in liquid level, a lower float assembly mounted on the vessel and including a float element projecting into the interior of the vessel, means forming part of said lower float assembly and accessible from the exterior of the vessel for balancing the weight of said float element to render the element highly sensitive to changes in liquid level, means actuated by the upper float assembly when the liquid in the vessel rises to a predetermined level for operating the control means to shut off flow through the inlet and to permit discharge of liquid through the outlet, additional means actuated by the lower float assembly when the liquid in the vessel falls to a predetermined level for operating the control means to shut off flow through the outlet and permit admission of liquid to the vessel through the inlet, and means forming part of said upper float assembly and accessible from the exterior of the vessel for adjusting the position of the upper float element relative to the vessel without changing the balanced condition of said float element, and additional means forming part of the lower float assembly for adjusting the position of the lower float element relative to the vessel without affecting the balanced condition of said float element.

22. A metering apparatus including, a vessel having a liquid inlet and a liquid outlet, a pressure actuated valve means for controlling flow through said inlet and said outlet, an upper float assembly mounted on said vessel and having a float element projecting into the interior thereof, a means forming part of said upper float assembly and accessible from the exterior of the vessel for balancing the weight of said upper float element to render said element highly sensitive to changes in liquid level, a lower float assembly mounted on the vessel and having a float element projecting into the vessel, means forming part of said lower float assembly and accessible from the exterior of the vessel for balancing the weight of said float element to render said element highly sensitive to changes in liquid level, a source of operating pressure, means for conducting the operating pressure to the pressure actuated valve means, a first control unit connected in the conducting means for controlling the application and release of operating pressure through the conducting means to the valve means, an operable connection between the first control unit and the upper float assembly for actuating said unit when the liquid in the vessel rises to a predetermined level to thereby operate pressure actuated valve means to close the inlet and open the outlet, a second control unit connected in the conducting means for also controlling the application and release of the operating pressure through the conducting means to the valve means, an operable connection between second control unit and the lower float assembly for actuating said second control unit when the liquid in the vessel falls to a predetermined level to thereby operate the pressure actuated valve means to close the outlet and open the inlet, means forming part of the upper float assembly for adjusting the position of the upper float element relative to the vessel without affecting the balanced condition of said element, and additional means forming part of the lower float assembly for adjusting the position of the lower float element relative to the vessel without affecting the balanced condition of said element, the adjusting means of both the upper and lower float assemblies being accessible from the exterior of the vessel.

23. As a sub-combination in a metering apparatus, a float assembly comprising a body having means for attaching it to a vessel, said body also having a longitudinal bore therein, a transverse shaft extending across the bore, a float element disposed outside of the bore of the body and having its supporting rod extending within the bore and secured to the transverse shaft, an adjusting means assembly located exteriorly of the body and having connection with the transverse shaft, whereby actuation of said adjusting means assembly imparts rotation to the shaft to adjust the position of the float secured thereto, said adjusting means including a balancing spring means for balancing the weight of the float and also including means operable from exteriorly of the body for varying the tension of the spring means.

24. The sub-combination set forth in claim 23, together with a pilot control unit supported upon the body and having a valve for controlling flow of a pressure fluid through said unit, and an operable connection between the adjusting means assembly of the float element and said valve for actuating the valve in accordance with the position of the float element as acted upon by a liquid.

References Cited in the file of this patent

UNITED STATES PATENTS

| 1,114,360 | Hornung | Oct. 20, 1914 |
| 1,876,958 | Kelly | Sept. 13, 1932 |
| 2,104,050 | Nibecker et al. | Jan. 4, 1938 |
| 2,105,262 | Price | Jan. 11, 1938 |
| 2,158,381 | Raymond | May 16, 1939 |
| 2,171,394 | Christian | Aug. 29, 1939 |
| 2,211,282 | McKeever | Aug. 13, 1940 |
| 2,225,949 | Bennett | Dec. 24, 1940 |
| 2,241,286 | Werts | May 6, 1941 |
| 2,353,641 | Brockett | July 18, 1944 |
| 2,376,473 | Brockett | May 22, 1945 |
| 2,484,580 | Overton | Oct. 11, 1949 |
| 2,730,123 | Quist | Jan. 10, 1956 |
| 2,747,043 | Schaefer | May 22, 1956 |
| 2,817,967 | Meyers | Dec. 31, 1957 |
| 2,831,350 | Banks | Apr. 22, 1958 |
| 2,936,622 | Glasgow | May 17, 1960 |
| 2,938,381 | Smith et al. | May 31, 1960 |